United States Patent
Kim et al.

(10) Patent No.: US 6,496,683 B1
(45) Date of Patent: Dec. 17, 2002

(54) APPARATUS AND METHOD FOR SUPPRESSING FREQUENCY INTERFERENCE

(75) Inventors: Sang-tae Kim, Sungnam (KR); Pyeong-hwan Wee, Seoul (KR)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/333,603

(22) Filed: Jun. 15, 1999

(30) Foreign Application Priority Data

Jun. 15, 1998 (KR) .......................................... 98-22288

(51) Int. Cl.[7] .................................................. H04B 1/00
(52) U.S. Cl. .......................... 455/63; 455/562; 455/550
(58) Field of Search .......................... 455/63, 296, 300, 455/114, 562, 550, 575, 278.1, 279.1; 343/779, 840, 836, 703, 700

(56) References Cited

U.S. PATENT DOCUMENTS

| | | | | |
|---|---|---|---|---|
| 2,790,169 A | * | 4/1957 | Sichak ........................ | 343/756 |
| 3,803,622 A | * | 4/1974 | Thornton ..................... | 343/836 |
| 4,109,253 A | * | 8/1978 | Chu ............................ | 343/756 |
| 4,446,465 A | * | 5/1984 | Donovan ..................... | 343/797 |
| 4,476,471 A | * | 10/1984 | Sato et al. ................... | 343/779 |
| 4,535,476 A | | 8/1985 | Carlin .......................... | 455/63 |
| 4,647,938 A | * | 3/1987 | Roederer et al. ............ | 343/756 |
| 4,677,440 A | * | 6/1987 | Edson et al. ................. | 342/157 |
| 4,725,847 A | * | 2/1988 | Poirier ......................... | 343/840 |
| 5,319,796 A | * | 6/1994 | Grube et al. ................. | 455/33.4 |
| 5,618,012 A | * | 4/1997 | Lehner et al. ............... | 244/168 |
| 5,652,597 A | * | 7/1997 | Caille .......................... | 343/756 |

* cited by examiner

Primary Examiner—Daniel Hunter
Assistant Examiner—Charles Chow
(74) Attorney, Agent, or Firm—Dilworth & Barrese, LLP

(57) ABSTRACT

An apparatus and method for suppressing interference between a first signal transmitted from an antenna of a first communication system and a second signal received by a second communication system in proximity to the first communication system, including: a reflecting assembly equipped to the transmit antenna of the first communication system and a position adjusting assembly for varying the slope of the reflecting assembly, moving the reflecting assembly right and left, and changing the height of the reflecting assembly. The reflecting assembly includes a plurality of lattices, with a gap between lattices having a width of the wavelength of the first signal divided by a natural number, and further includes two reflecting panes made from aluminum that are symmetric about the adjusting assembly and each have a width equal to the length of the transmit antenna.

19 Claims, 13 Drawing Sheets

FIG. 7

| LOCATION AND ANGLE OF REFLECTOR | RECEIVE SIGNAL LEVEL (dBm) | SUPPRESSION LEVEL OF SIGNAL ISOLATION THROUGH THE REFLECTOR | ANTENNA SIGNAL ISOLATION |
|---|---|---|---|
| NO REFLECTOR | −39.46 | | 49.46dB |
| REFLECTOR 75° | −50.46 | 11dB | |
| REFLECTOR 45° | −62.74 | 23.28dB | |
| MAXIMUM ATTENUATION POINT | −69.98 | 30.52dB | |

FIG. 9

| LOCATION AND ANGLE OF REFLECTOR | RECEIVE SIGNAL LEVEL (dBm) | SUPPRESSION LEVEL OF SIGNAL ISOLATION THROUGH THE REFLECTOR | ANTENNA SIGNAL ISOLATION |
|---|---|---|---|
| NO REFLECTOR | -55.45 | | 65.45dB |
| MAXIMUM ATTENUATION POINT | -77.85 | 22.4dB | |

FIG. 11

| LOCATION AND ANGLE OF REFLECTOR | RECEIVE SIGNAL LEVEL (dBm) | SUPPRESSION LEVEL OF SIGNAL ISOLATION THROUGH THE REFLECTOR | ANTENNA SIGNAL ISOLATION |
|---|---|---|---|
| NO REFLECTOR | -38.17 | | 48.17dB |
| REFLECTOR 75° | -53.44 | 15.27dB | |
| REFLECTOR 45° | -58.53 | 20.36dB | |
| MAXIMUM ATTENUATION POINT | -63.85 | 25.68dB | |

FIG. 13

| LOCATION AND ANGLE OF REFLECTOR | RECEIVE SIGNAL LEVEL (dBm) | SUPPRESSION LEVEL OF SIGNAL ISOLATION THROUGH THE REFLECTOR | ANTENNA SIGNAL ISOLATION |
|---|---|---|---|
| NO REFLECTOR | -37.38 | | 47.38dB |
| REFLECTOR 75° | -48.22 | 10.84dB | |
| REFLECTOR 45° | -58.14 | 20.76dB | |
| MAXIMUM ATTENUATION POINT | -74.95 | 37.57dB | |

APPARATUS AND METHOD FOR SUPPRESSING FREQUENCY INTERFERENCE

BACKGROUND OF THE INVENTION

1. Field of the Invention

The present invention relates to an apparatus for suppressing interference in wireless telecommunications systems, and in particular to an apparatus and method for suppressing frequency interference occurring between a transmitting device and a receiving device in a mobile telecommunication system.

2. Description of the Related Art

A cellular mobile telecommunication system allows a subscriber to communicate with other subscribers. The entire service area is divided into a plurality of cells having a corresponding base station. The base stations are centralized by a mobile switching center.

The cellular mobile telecommunication system is divided into an analog cellular system and a digital cellular system. The AMPS (Advanced Mobile Phone System) functions as the analog cellular system and the CDMA (Code Division Multiple Access) or the FDMA (Frequency Division Multiple Access) system function as the digital cellular system.

Due to the rapid and exponentional growth of mobile telecommunications, a plurality of users use limited frequency resources, particularly in cities. Hence, two or more systems using different communication methods may be located adjacent to each other. Therefore, the frequency separation between the systems becomes narrow and frequency interference inevitably occurs between the systems.

Consequently, the transmit frequency and receive frequency of two signals adjacent to each other and corresponding to two different systems are not sufficiently apart from each other, thereby causing interference which can significantly affect voice quality. Generally, the output signal and interference signals of a system using one particular communication method or protocol causes degradation in the receiving capability of the other system using a different communication method. The interference condition is typically dealt with by limiting frequency allocation or by adjusting a radiation pattern of the transmitting antenna. Another conventional method is to incorporate a transmit band pass filter (TBPF) in the transmitting system to pass only a transmit frequency band and to incorporate a receive band pass filter (RBPF) in the receiving system to pass only a receive frequency band.

However, conventional methods do not completely suppress frequency interference when the transmit frequency of a system is close proximity with the receive frequency of another system, because the TBPF and RBPF can not completely isolate the out-of-band signals.

The band pass filters, which are used in the mobile telecommunication system, include a band pass filter to pass the in-band frequency and a notch filter to maximally reduce the out-of-band frequency interference. However, the filter has a larger insertion loss than the band pass filter, and therefore may adversely affect system performance. Additionally, the noise attenuation characteristics in the band where the out-of-band frequency is apart within 1 Mega-Hertz (MHz) cannot obtain effects better than the general band pass filter. Therefore, in circumstances where the transmit frequency of a system is in close proximity with the receive frequency of another system, it has been generally required to do something more than to add a notch filter for solving the problem of frequency interference.

U.S. Pat. No. 4,535,476 discloses an offset geometry, interference canceling receiver which performs interference cancellation by the dither signal frequency and a round trip signal delay. The apparatus solves the problem of frequency interference by coupling an antenna to cancellation circuits via several duplexer and amplifier circuit combinations. However, the apparatus cannot suppress frequency interference occurring between different systems in proximity to each other.

SUMMARY OF THE INVENTION

The present invention provides an apparatus and method for suppressing frequency occurring between different communication systems. An apparatus and method for suppressing frequency occurring between different communication systems are provided. The apparatus and method suppress frequency interference by providing a reflecting assembly in proximity to a transmitting antenna.

In the case where frequency of a first signal causes interference with a frequency of a second signal, where the frequency of the first signal is transmitted from a transmit antenna of a first communication system and the frequency of the second signal is received by a receive antenna of a second communication system in proximity to the first communication system, the apparatus of the present invention includes: a reflecting assembly for reducing the incoming interference signal from the transmit antenna to the receive antenna, wherein the reflecting assembly is equipped to the transmit antenna of the first communication system; and an adjusting assembly operatively associated with the reflecting assembly to adjust the position of the reflecting assembly. The position is adjusted by varying the slope of the reflecting assembly, by moving the reflecting assembly right and left, and by changing the height of the reflecting assembly.

The reflecting assembly includes a plurality of lattices, where a gap is defined between each of the plurality of lattices having a width of $\lambda/N$, where $\lambda$ is the wavelength of the first signal and N is a natural number. The reflecting assembly includes two reflecting panes made from aluminum and symmetric about the adjusting assembly. The width of each of the reflecting panes is equal to the length of the transmit antenna.

The method of the present invention suppresses frequency interference where a frequency of a first signal causes interference with a frequency of a second signal, the first signal being transmitted from a transmit antenna of a first communication system, the second signal being received by a receive antenna of a second communication system in proximity to the first communication system. The method comprises the steps of: providing a reflecting assembly for reducing the incoming interference signal from the transmit antenna to the receive antenna, the reflecting assembly being equipped to the transmit antenna of said first communication system; and adjusting the position of the reflecting assembly to suppress the frequency interference.

The present invention suppresses frequency interference when the transmit and receive antennas of a telecommunications system have a narrow frequency separation and are located in proximity to each other.

BRIEF DESCRIPTION OF THE DRAWINGS

FIG. 7 is a table illustrating interference cancellation results of the first preferred construction arrangement of FIG. 6;

FIG. 9 is a table illustrating interference cancellation results of the second preferred construction arrangement of FIG. 8;

FIG. 11 is a table illustrating interference cancellation results of the third preferred construction arrangement of FIG. 10;

FIG. 13 is a table illustrating interference cancellation results of the fourth preferred construction arrangement of FIG. 12.

DETAILED DESCRIPTION OF PREFERRED EMBODIMENTS

Preferred embodiments of the present invention will be described herein below with reference to the accompanying drawings. In the following description, well known constructions or functions are not described in detail so as not to obscure the present invention.

Figure 1:
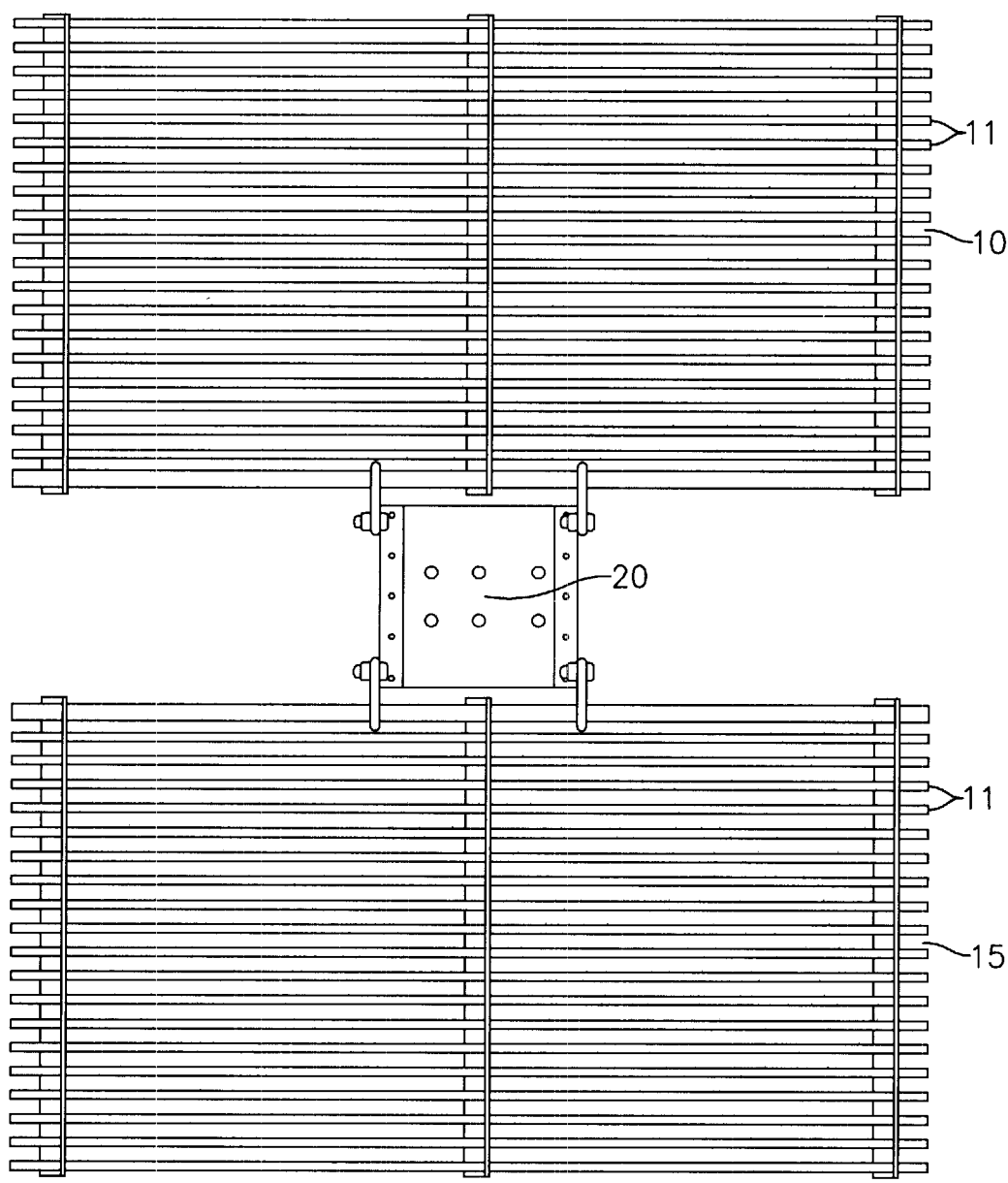
FIG. 1 is a perspective top view of a reflector assembly according to the present invention.

With reference to FIG. 1, there is shown a perspective top view of a reflecting assembly designated generally by reference numeral 5 according to the present invention. The reflecting assembly 5 includes a first reflecting pane 10 having a plurality of lattices 11 and a second first reflecting pane 15 having a plurality of lattices 11; and an adjusting mechanism 20 coupled to each reflecting pane 10, 15 for adjusting the slope and angle of the reflecting panes 10, 15.

Figure 2:
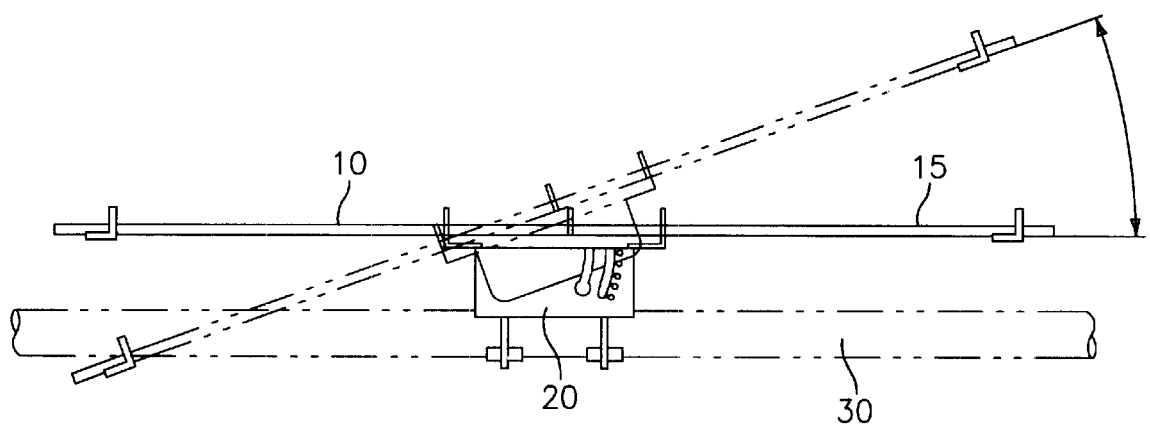
FIG. 2 is a side view in phantom of the reflecting assembly of FIG. 1 showing movement thereof.
Figure 3:
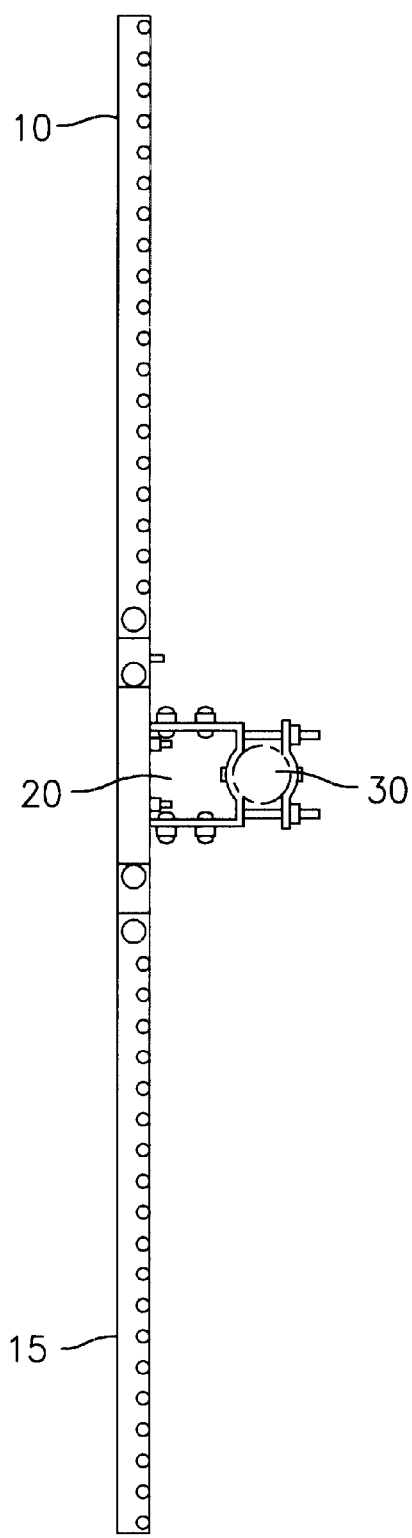
FIG. 3 is a perspective side view of the reflecting assembly of FIG. 1.

FIG. 2 is a side view of the reflecting assembly 5 along the longitudinal axis showing the first reflecting plane 10, the second reflecting plane 15, and the adjusting mechanism 20. The adjusting mechanism 20 is fixed to a pole 30 coupled to a transmit antenna 200 (see FIG. 4). The slope, height, position and angles of the first and second reflecting panes 10, 15 are adjusted by the adjusting mechanism 20. FIG. 3 is a perspective side view along the horizontal axis of the reflecting assembly 5 showing the adjusting mechanism 20 fixed to the pole 30 of the transmit antenna 200 and the first and second reflecting planes 10, 15 fixed to the adjusting mechanism 20.

The size of the reflecting assembly 5 is determined according to the size of the transmit antenna 200 intended to be connected thereto. Preferably, the length of the reflecting assembly 5 along the longitudinal axis is equal to the length of the transmit antenna 200 and the width of the reflecting assembly 5 along the horizontal axis is maximized accordingly to prevent distortion of the beam pattern of a signal transmitted by the transmit antenna 200. In addition, the reflecting assembly 5 is constructed from aluminum to be durable to prevent damage from rain, sleet, snow, weight, etc.

Figure 4:
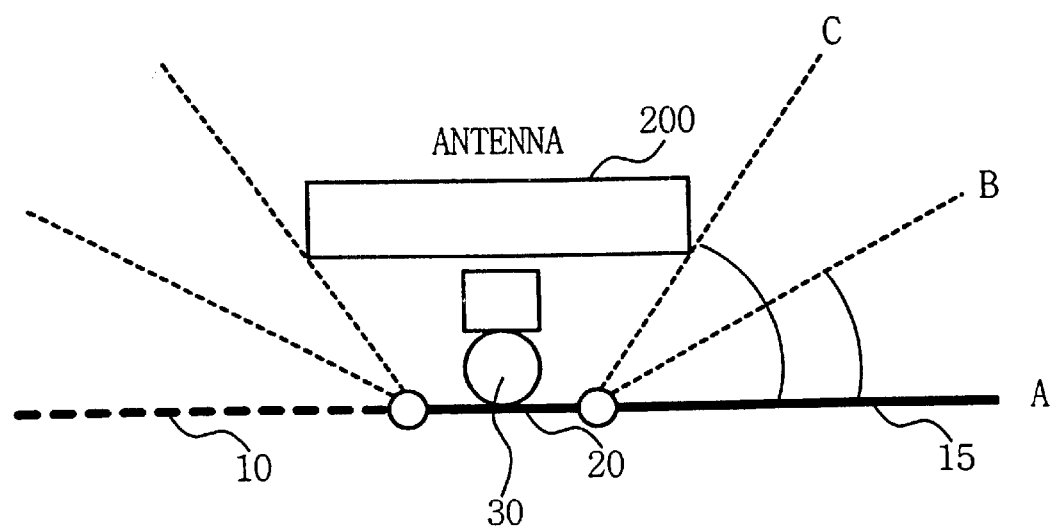
FIG. 4 is a diagram illustrating the reflecting assembly according to the present invention coupled to an antenna.

With reference to FIG. 4, there is shown the reflecting assembly 5 according to the present invnetion coupled to the antenna 200. As illustrated in FIG. 4, if the signal beam is radiated from the front of transmit antenna 200, the reflecting assembly 5 is positioned to the side or rear of transmit antenna 200. Further, according to the position of receive antenna 400 (FIG. 5) interfered with, the slope and angle of the first reflecting pane 10 and the second reflecting pane 15 are adjusted. As shown by FIG. 4, the first reflecting pane 10 and the second reflecting pane 15 are adjusted to positions, A, B or C by adjusting the angle of the panes 10, 15 with respect to the horizontal axis. The first reflecting pane 10 and the second reflecting pane 15 are adjacently positioned to the side or rear of transmit antenna 200 to cause a mutual interference when frequency separation of transmit antenna 200 and receive antenna 400 of two different systems is narrow. The reflecting panes 10, 15 can be moved into various configurations according to the established configuration of transmit antenna 200 and receive antenna 400 and the level of interference. By the present invention, one can find a point at which the maximum effectiveness is obtained in suppressing the interference by adjusting the position, angle, etc. of one or both of the reflecting panes 10, 15.

Figure 5:
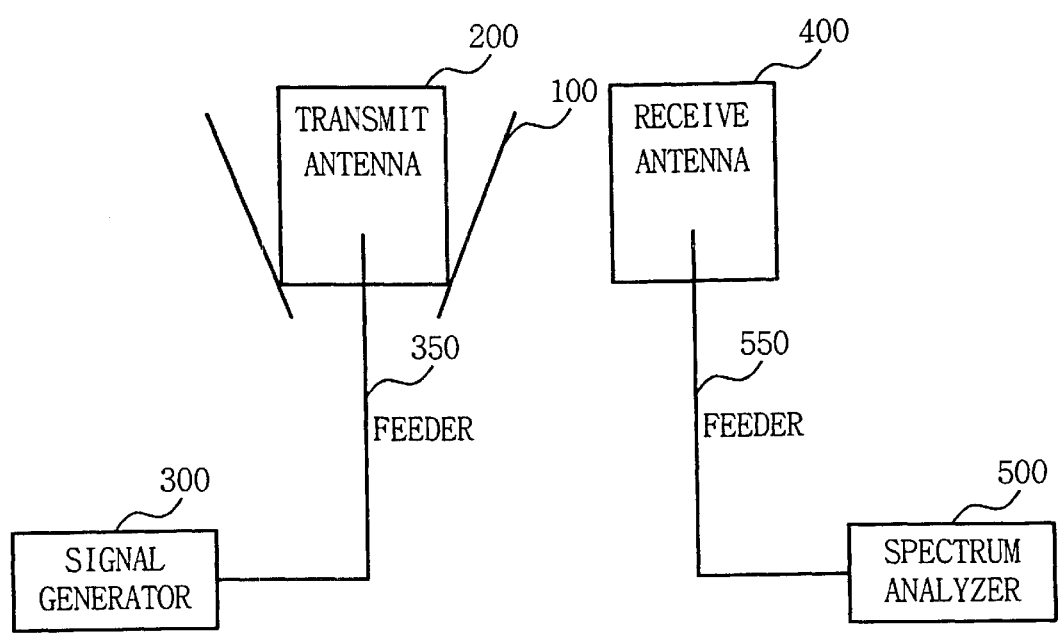
FIG. 5 is a block diagram illustrating the reflecting assembly of FIG. 1 coupled to a transmit antenna.

For example, it is possible to find the optimum slope and angle which greatly minimizes the frequency interference by positioning one or both of the reflecting panes 10, 15 at an angle B as shown in FIG. 4. The panes 10, 15 are then gradually moved to change the angle while measuring the level of interference at receive antenna 400 by using measuring means, such as a spectrum analyzer 500 (FIG. 5). The reflecting assembly 5 serves as a kind of shield to prevent the interference signal of the transmit antenna 200 from flowing in the receive antenna 400 and also isolates an inflow of a signal contributing to the interference. FIG. 5 illustrates a construction arrangement of transmit antenna 200 coupled to the reflecting assembly 5; the receive antenna 400 is also shown. As illustrated in FIG. 5, a signal generator 300 generates a signal to be transmitted by transmit antenna 200. The signal is received by the transmit antenna 200 from the signal generator 300 via feeder line 350. The reflecting panes 10, 15 are positioned against the transmit antenna 200 and receive antenna 400 is positioned adjacent to the transmit antenna 200. The spectrum analyzer 500 measures the level of the frequency interference by receiving the signal from the receive antenna 400 via feeder line 550.

Figure 6:
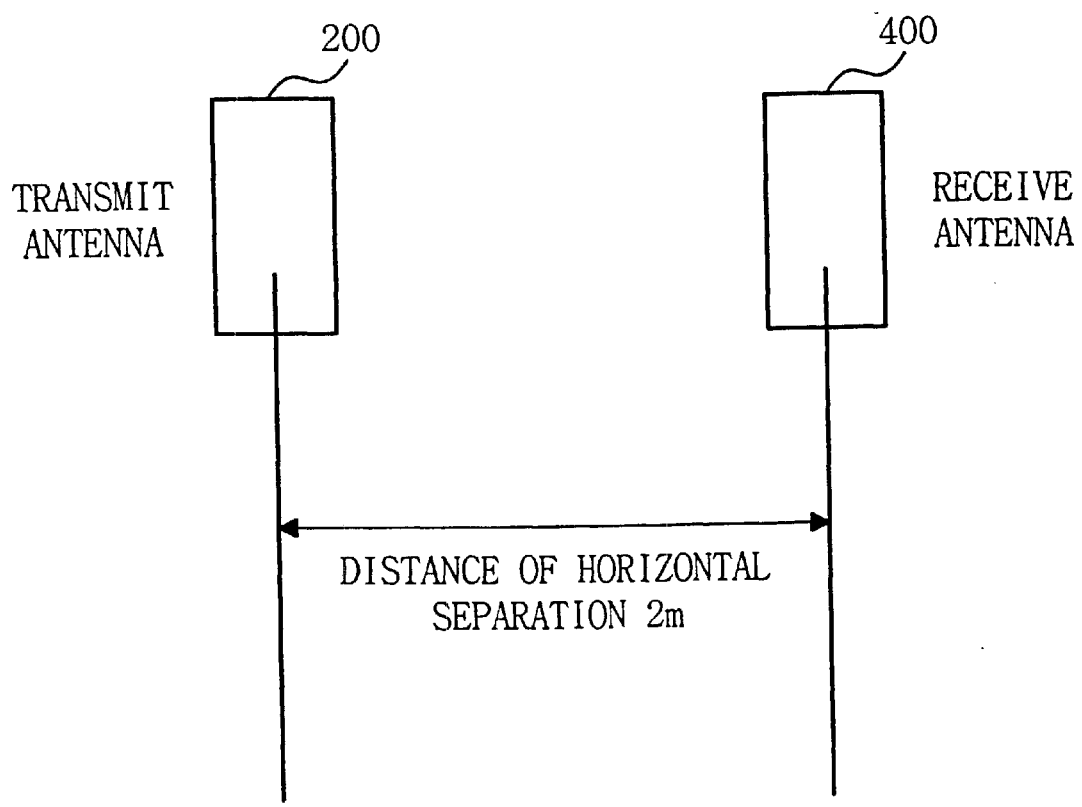
FIG. 6 is a block diagram illustrating a first preferred construction arrangement of the transmit antenna and a receive antenna.

Several additional preferred construction arrangements for the reflecting assembly according to the present invention will now be described with reference to FIGS. 6–13. FIG. 6 illustrates a first preferred construction arrangement where transmit antenna 200 is equally as high as receive antenna 400 and the distance of horizontal separation between the antennas 200, 400 is 2 meters. The length of each feeder line 350, 550 is 3 meters. The transmit frequency is 880 MHz and transmit level is 10 dBm. The transmit and receive antennas are 13 dBd—60° sector antennas having a beam width measuring 60° horizontally and 8° vertically.

When the reflecting assembly 5 is arranged with the construction of FIG. 6, the receive isolation level according to a variation in slope and angle of the reflecting panes 10, 15 is shown by the table of FIG. 7. When the slope and angle of the reflecting panes 10, 15 are optimized, the signal isolation level via the reflecting assembly 5 becomes about 30.52 dB. Hence, it is possible to decrease the interference signal level by as much as 30.52 dB.

Figure 8:
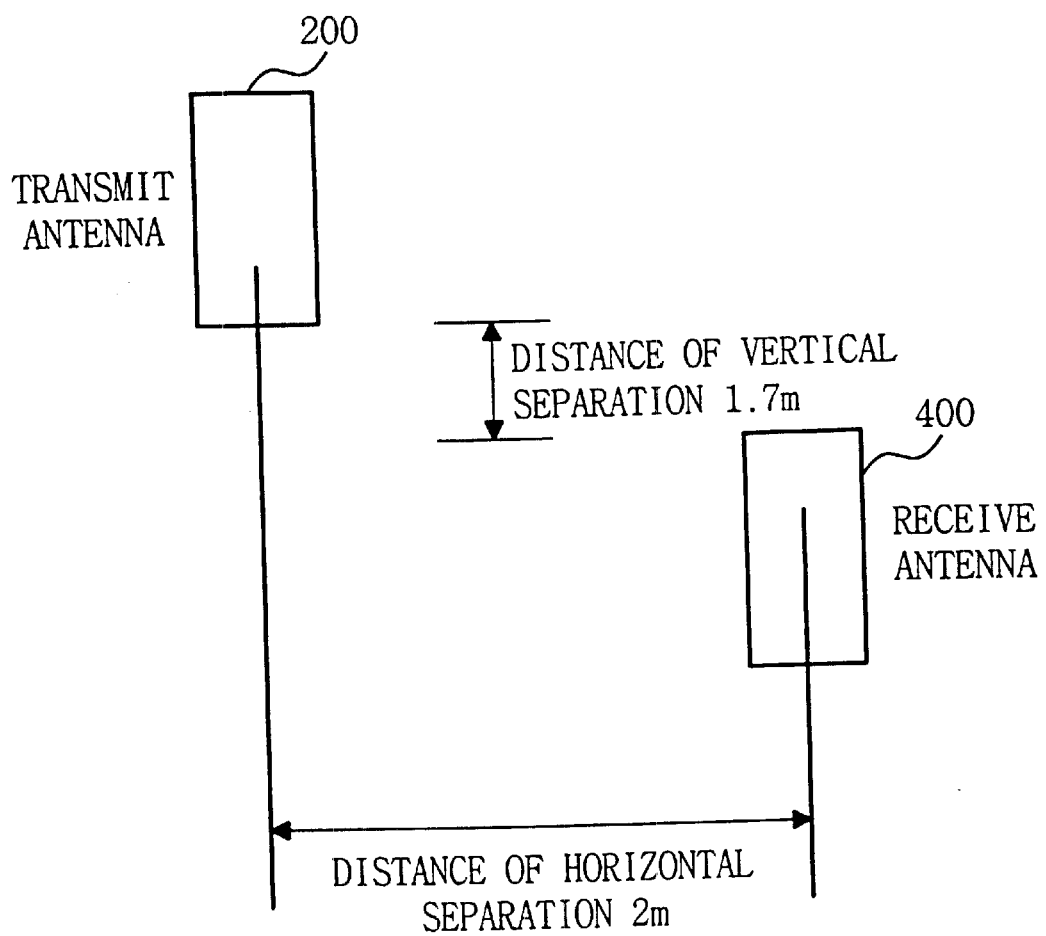
FIG. 8 is a block diagram illustrating a second preferred construction arrangement of the transmit antenna and the receive antenna.

FIG. 8 illustrates a second preferred construction arrangement where transmit antenna 200 is higher than receive antenna 400 and the distance of horizontal separation is 2 meters. The distance of vertical separation is 1.7 meters. The length of the feeder line is 3 meters. Transmit frequency is 880 MHz and transmit level is 10 dBm. The transmit and receive antennas are 13 dBd—60° sector antennas having a beam width measuring 60° horizontally and 8° vertically.

When the reflecting assembly 5 is arranged with the construction of FIG. 8, the receive isolation level according to a variation in slope and angle of the reflecting panes 10, 15 is shown by the table of FIG. 9. When the slope and angle of the reflecting panes 10, 15 are optimized, the signal isolation level via the reflecting assembly 5 becomes about 22.4 dB. Hence, it is possible to decrease the interference signal level by as much as 22.4 dB.

Figure 10:
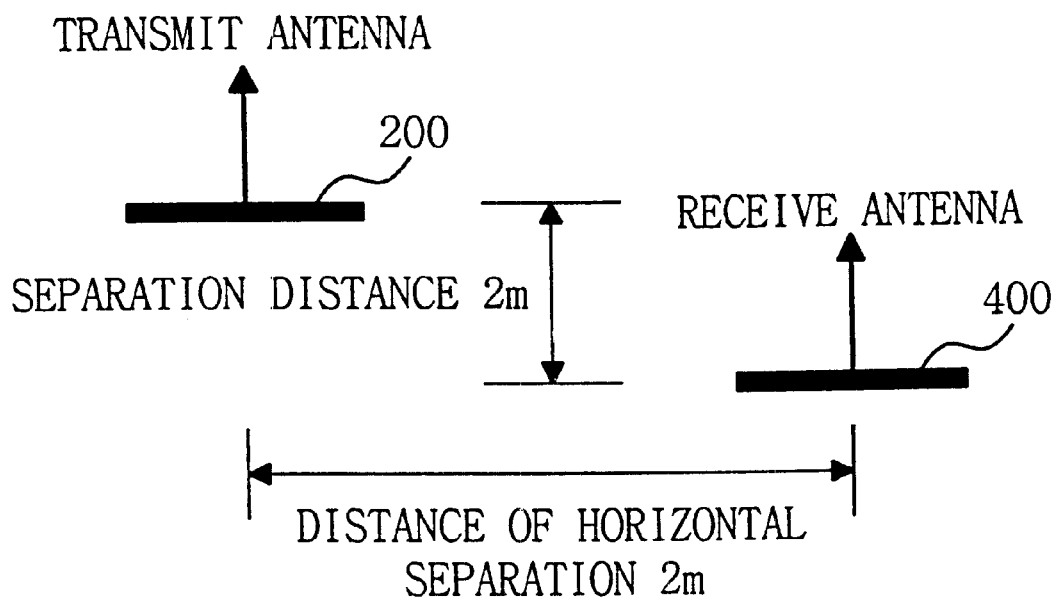
FIG. 10 illustrates a third preferred construction arrangement of the transmit antenna and the receive antenna.

FIG. 10 illustrates a third preferred construction arrangement where transmit antenna 200 is equally as high as receive antenna 400 and the distance of horizontal separation is 2 meters. The distance between front and rear is 2 meters. That is, the transmit antenna 200 is positioned in front of the receive antenna 400 by 2 meters. The length of the feeder line is 3 meters. Transmit frequency is 880 MHz and transmit level is 10 dBm. The transmit and receive antennas are 13 dBd—60° sector antennas having a beam width measuring 60° horizontally and 8° vertically.

When the reflecting assembly 5 is arranged with the construction of FIG. 10, the receive isolation level according to a variation in slope and angle of the reflecting panes 10, 15 is shown by the table of FIG. 11. When the slope and angle of the reflecting panes 10, 15 are optimized, the signal isolation level via the reflecting assembly 5 becomes about 25.68 dB. Hence, it is possible to decrease the interference signal level by as much as 25.68 dB.

Figure 12:
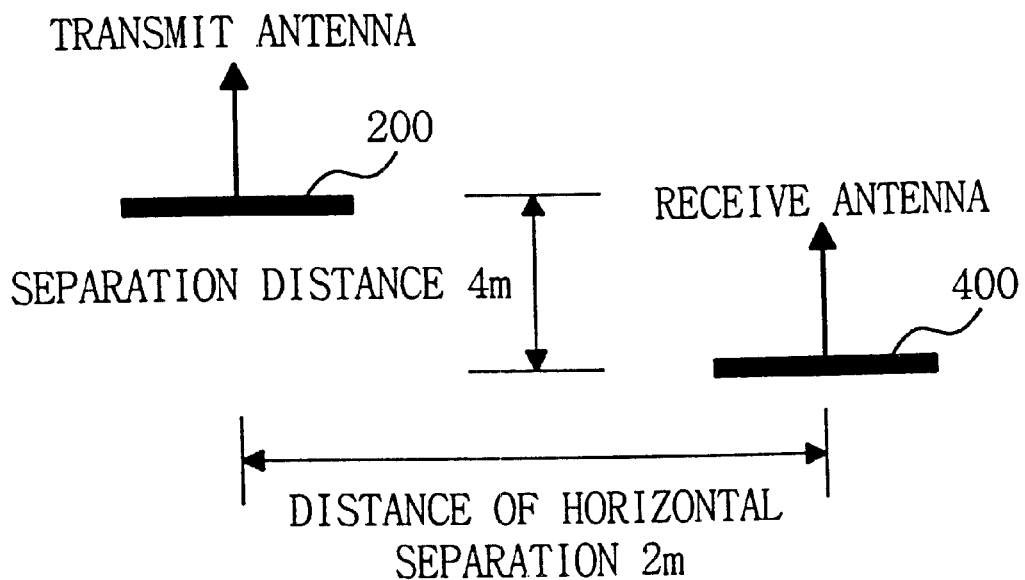
FIG. 12 illustrates a fourth preferred construction arrangement of the transmit antenna and the receive antenna.

FIG. 12 illustrates a fourth preferred construction arrangement where transmit antenna 200 is equally as high as receive antenna 400 and the distance of horizontal separation is 2 meters. The distance between front and rear is 4 meters. That is, the transmit antenna 200 is positioned in front of the receive antenna 400 by 4 meters. The length of the feeder line is 3 meters. Transmit frequency is 880 MHz and transmit level is 10 dBm. The transmit and receive antennas are 13 dBd—60° sector antennas having a beam width measuring 60° horizontally and 8° vertically.

When the reflecting assembly 5 is arranged with the construction of FIG. 12, the receive isolation level according to a variation in slope and angle of the reflecting panes 10, 15 is shown by the table of FIG. 13. When the slope and angle of the reflecting pages 10, 15 are optimized, the signal isolation level via the reflecting assembly 5 becomes about 37.57 dB. Hence, it is possible to decrease the interference signal level by as much as 37.57 dB.

As described above in conjunction with the drawings, when the transmit and receive antennas of a telecommunication system have a narrow frequency separation and are positioned adjacent to each other, it is possible to suppress the level of frequency interference by using a reflecting assembly according to the present invention. The reflecting assembly 5 of the present invention is contemplated for use in telecommunication systems operating under various communication protocols, such as CDMA, FDMA and AMPS.

While the invention is susceptible to various modification and alternative forms, specific embodiments thereof have been shown by way of example in the drawings and herein described in detail. It should be understood, however, that it is not intended to limit the invention to the particular forms disclosed, but on the contrary, the intention is to cover all modification, equivalents, and alternatives falling within the spirit and scope of the invention as defined by the appended claims.

What is claimed is:

1. An apparatus for suppressing frequency interference where a first signal causes interference with a second signal having a narrow frequency separation from said first signal, said first signal being transmitted from a transmit antenna of a first communication system, said second signal being received by a receive antenna of a second communication system in close proximity to said first communication system, said apparatus comprising:

substantially planar reflecting means for reducing said incoming interference signal from said transmit antenna to said receive antenna, said reflecting means including a plurality of lattices being equipped to and substantially symmetrical about said transmit antenna of said first communication system; and adjusting means operatively associated with said reflecting means for automatically adjusting the position of said reflecting means effectively symmetrically with respect to the transmit antenna to suppress said frequency interference.

2. The apparatus as set forth in claim 1, wherein said adjusting means is configured to adjust the height of said reflecting means.

3. The apparatus as set forth in claim 1, wherein a gap is defined between each of said plurality of lattices having a width of $\lambda/N$, where $\lambda$ is the wavelength of said first signal and N is a natural number.

4. The apparatus as set forth in claim 3, wherein N is 10.

5. The apparatus as set forth in claim 1, wherein said reflecting means includes two reflecting panes symmetric about said adjusting means.

6. The apparatus as set forth in claim 1, wherein said first communication system and said second communication system use the same communication protocol.

7. The apparatus as set forth in claim 1, wherein said first communication system and said second communication system use different communication protocols.

8. The apparatus as set forth in claim 7, wherein the width of each of said reflecting panes is equal to the length of said transmit antenna.

9. The apparatus as set forth in claim 1, wherein said adjusting means adjusts the position of the reflecting means to an optimum position defined as a position where a beam pattern of said first signal is the least distorted.

10. An apparatus for suppressing frequency interference where a first signal causes interference with a second signal having a narrow frequency separation from said first signal, said first signal being transmitted from a transmit antenna of a first communication system, said second signal being received by a receive antenna of a second communication system in close proximity to said first communication system, said apparatus comprising:

a reflecting assembly of substantially planar components for reducing said incoming interference signal from said transmit antenna to said receive antenna, said reflecting assembly including a plurality of lattices and being equipped to said transmit antenna of said first communication system; and an adjusting assembly operatively associated with said reflecting assembly where the substantially planar components automatically adjust, effectively symmetrically with respect to the transmit antenna, the position of said reflecting assembly to suppress said frequency interference.

11. The apparatus as set forth in claim 10, wherein said adjusting assembly is configured to adjust the height of said reflecting assembly.

12. The apparatus as set forth in claim 10, wherein a gap is defined between each of said plurality of lattices having a width of $\lambda/N$, where $\lambda$ is the wavelength of said first signal and N is a natural number.

13. The apparatus as set forth in claim 12, wherein N is 10.

14. The apparatus as set forth in claim 10, wherein said reflecting assembly includes two reflecting panes symmetric about said adjusting assembly.

15. The apparatus as set forth in claim, 10, wherein said first communication system and said second communication system use the same communication protocol.

16. The apparatus as set forth in claim 10, wherein said first communication system and said second communication system use different communication protocols.

17. The apparatus as set forth in claim 14, wherein the width of each of said reflecting panes is equal to the length of said transmit antenna.

18. The apparatus as set forth in claim 10, wherein said adjusting assembly adjusts the position of reflecting assembly to an optimum position defined as a position where a beam pattern of said signal is the least distorted.

19. A method for suppressing frequency interference where a first signal causes interference with a second signal having a narrow frequency separation from said first signal, said first signal being transmitted from a transmit antenna of a first communication system, said second signal being received by a receive antenna of a second communication system in close proximity to said first communication system, said method comprises the steps of:

providing an effectively symmetrical reflecting means of substantially planar components for reducing said incoming interference signal from said transmit antenna to said receive antenna, said reflecting means being equipped to said transmit antenna of said first communication system; and automatically adjusting of the position of said reflecting means effectively symmetrically about the transmit antenna to suppress said frequency interference.

* * * * *